Figure 1:
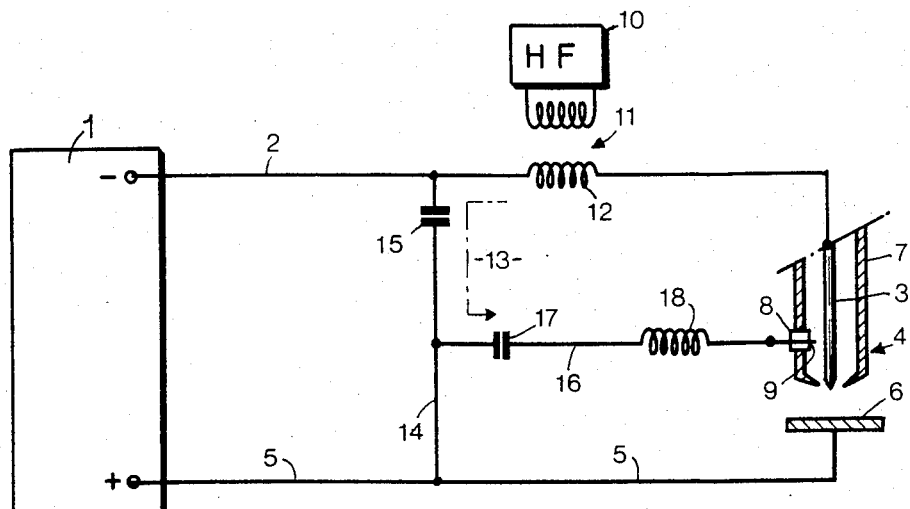

United States Patent [19]

Legrand et al.

[11] Patent Number: 4,493,969
[45] Date of Patent: Jan. 15, 1985

[54] HIGH-FREQUENCY ARC STRIKING DEVICE AND AUXILIARY ELECTRODE OF AN ELECTRIC WELDING OR CUTTING ARC

[75] Inventors: Pierre Legrand, Pontoise; Michel Arnout, Franconville, both of France

[73] Assignee: L'Air Liquide, Societe Anonyme pour l'Etude et l'Exploitation des Procedes Georges Claude, Paris, France

[21] Appl. No.: 550,242

[22] Filed: Nov. 9, 1983

[30] Foreign Application Priority Data

Nov. 12, 1982 [FR] France ............................... 8219007

[51] Int. Cl.³ .............................................. B23K 9/06
[52] U.S. Cl. ................................... 219/130.4; 219/136
[58] Field of Search .............. 219/130.4, 121 PW, 136

[56] References Cited

U.S. PATENT DOCUMENTS 2,516,037  0/1950  Williams.
2,784,349  3/1957  Anderson ........................ 219/130.4
3,089,019  0/1963  Reis et al..
4,170,727  10/1979  Wilkins.
4,280,042  7/1981  Berger et al..

FOREIGN PATENT DOCUMENTS 1918267  10/1970  Fed. Rep. of Germany ... 219/130.4
2275963  1/1976  France.
2404372  4/1979  France.
2447770  8/1980  France.
6801103  of 1969  Netherlands Primary Examiner—Clifford C. Shaw
Attorney, Agent, or Firm—Lee C. Robinson, Jr.

[57] ABSTRACT

A high frequency-high voltage generator supplies current, on one hand, to a first arc striking circuit connecting a main electrode to an auxiliary electrode and, on the other hand, to a second arc striking circuit which connects one of the two electrodes to the workpiece to be treated. In this way there is achieved a striking of the arc in two stages. This ensures high reliability regardless of the nature of the material from which the workpiece is made regardless of the protecting gas used, in particular for the TIG welding of light alloys in a helium atmosphere. The device is applicable to an automatic TIG welding.

11 Claims, 3 Drawing Figures

HIGH-FREQUENCY ARC STRIKING DEVICE AND AUXILIARY ELECTRODE OF AN ELECTRIC WELDING OR CUTTING ARC

The present invention relates to a device for striking an electric arc between a main non-consumable electrode and a workpiece to be welded or cut under a gaseous atmosphere conducted through a nozzle surrounding the electrode and is particularly directed to a device of the type comprising a high frequency-high voltage generator connected to an arc striking circuit connecting the main electrode to an auxiliary electrode carried by the nozzle. The invention is in particular applicable to the automatic welding of the TIG type, i.e. of the type employing a non-consumable electrode under a gaseous stream.

The arc striking devices of the above type permit in the HF circuit, at least partial use of conductors or cables having a strong HF insulation distinct from the welding conductors or cables. In this way, the HF losses are considerably reduced, so that the HF generator may be disposed at a certain distance from the manual welding torch or the automatic welding head. In particular, in the case of automatic welding machines, there is an appreciable reduction in the overall size of the welding head.

However, experience has shown that, for reasons which are at present not understood, the known arc striking devices do not give a reliable and instantaneous striking of the arc. Thus it has been found that the arc is established only when the main electrode is at a very small distance from the workpiece. Consequently, the automatic welding machines must be provided with in addition to a welding current detector, a device for advancing the welding head toward the workpiece at two speeds (a rapid speed and then a slow speed) controlled by a closeness detector, which complicates the unit and increases the duration of each welding cycle.

Further, the known striking devices are unsatisfactory for the welding of light alloys under helium in the TIG method.

An object of the invention is to provide an arc striking device which produces an instantaneous and perfectly reliable striking of the arc regardless of the material of the workpiece to be welded and regardless of the protecting gas employed, at a relatively large distance between the workpiece and the main electrode.

The invention therefore provides an arc striking device of the aforementioned type, wherein the high frequency-high voltage generator is also connected to a second arc striking circuit which connects one of the electrodes to the workpiece and the first circuit has an HF impedance which is distinctly higher than that of the second circuit.

Figure 2:
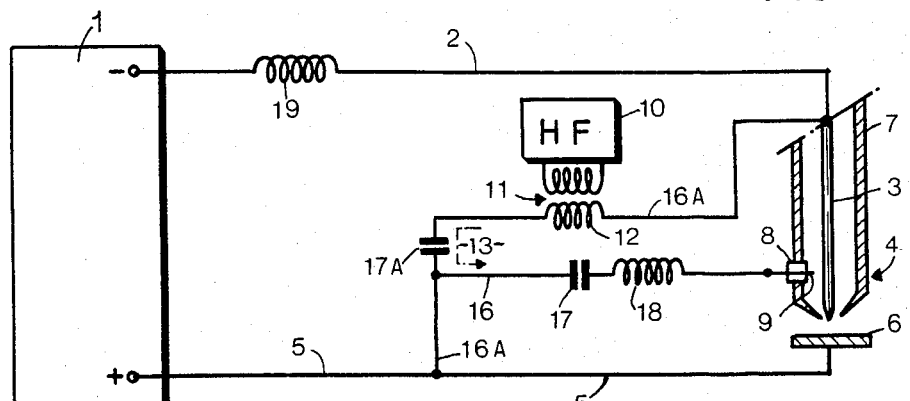
Figure 3:
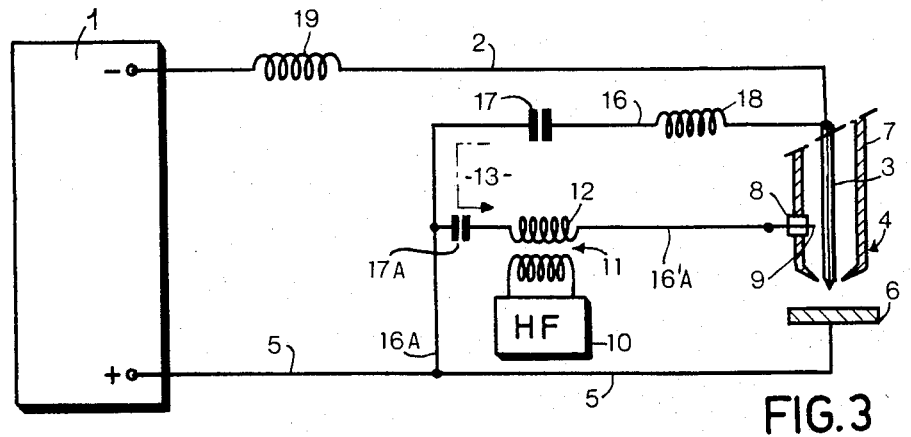

The invention will now be described in detail with reference to the accompanying drawing Figures in which FIGS. 1-3 show respectively the electric diagrams of three embodiments of the invention.

In each of the FIGS. 1-3, the invention has been illustrated in its application to the TIG welding with direct current under a simple gaseous stream. Each of the considered welding units thus comprises a dc generator 1 whose negative (−) terminal is connected by a conductor 2 to a main electrode 3 of a welding torch or head 4 and whose positive (+) terminal is connected by another conductor 5 to a workpiece 6 to be welded.

The torch or head 4 has a nozzle 7 for conducting a protecting gas which coaxially surrounds the electrode 3. In its end part, this nozzle 7 carries an insulating sleeve 8 which extends radially therethrough and acts as a support for an auxiliary electrode 9 which extends toward the main electrode 3 and is spaced at a short distance from the latter.

Each of the three embodiments illustrated in the drawing comprises a high frequency-high voltage current generator 10 constituted for example by an oscillating circuit having a spark-gap supplied with 220 V ac and provided with a high frequency transformer 11. The secondary winding 12 of the transformer 11 supplies current to two HF arc striking circuits in parallel, one of which has the reference numeral 13 and connects the main electrode 3 to the auxiliary electrode 9.

The features of each of the units shown in FIGS. 1, 2 and 3 will now be described in detail.

In the embodiment shown in FIG. 1, the secondary winding 12 of the HF transformer is in series with the power conductor 2 and the arc striking circuit 13 includes an isolating capacitor 17 for the welding current in series with an induction coil 18. The second arc striking circuit connects, by a conductor 14 having an isolating capacitor 15 for the welding current and the conductor 5, a terminal of the secondary winding 12 to the workpiece 6.

In operation, when the torch or the head 4 is spaced far away from the workpiece 6, the supply of current to the HF generator 10 produces between the two electrodes 3 and 9 through the circuit 13 solely, an HF arc striking discharge which ionizes the gas passing through the nozzle 7.

When the torch or the head 4 approaches the workpiece 6, there is formed at a certain distance between the electrode 3 and the workpiece 6, a second HF arc striking circuit constituted by the winding 12, the electrode 3, the conductor 14 having the isolating capacitor 15, the conductor 5, the workpiece 6 and the gap between the main electrode 3 and the workpiece 6. This second arc striking circuit has, for this distance between the electrode 3 and the workpiece 6, an HF impedance which is distinctly lower than that of the first striking circuit 13 owing to the insertion of the induction coil 18 in the circuit 13. Consequently, the main part of the HF arc striking energy is no longer transmitted between the two electrodes 3 and 9, but through the effective work gap, namely in the gap between the main electrode 3 and the workpiece 6. The capacitor 15 constitutes a virtual HF short circuit and a switch for the welding current, which protects the generator 1, while the capacitor 17 prevents the welding direct current from passing through the auxiliary electrode 9.

Tests carried out have shown that there is obtained in this way a perfectly reliable striking of the welding arc between the electrode 3 and the workpiece 6 at distances apart which may be as much as about 1 cm. regardless of the nature of the material of the workpiece 6 and the nature of the protecting gas employed, in particular in the welding of light alloys under helium. In automatic welding it is then possible to cause the head 4 to approach the workpiece 6 rapidly, for example at a speed of about 1 m. per min. and then to stop this approach by a simple detection of the welding current by means of a conventional device (not shown).

The arrangement shown in FIG. 2 is on the whole similar to the foregoing arrangement but permits a reduction in the length of the power conductor through which the HF current passes.

Indeed, in this embodiment, a first conductor 16A having a strong HF insulation connects the electrode 3 to the power conductor 5. Connected in series in this conductor 16A, starting at the electrode 3, are a secondary winding 12 of the HF transformer 11 and a capacitor 17A. The conductor 16 including the capacitor 17 and the induction coil 18 connects the auxiliary electrode 9 to the conductor 5.

This unit operates in the same way as that of FIG. 1, by the transmission of an HF arc striking discharge first of all between the two electrodes 3 and 9 and then, as soon as the electrode 3 is sufficiently close to the workpiece 6 (distance of the order of a centimeter), mainly between the electrode 3 and the workpiece 6, as the second arc striking circuit 16A-5 has an HF impedance distinctly lower than that of the circuit 13. In order to avoid the passage of the HF current to the generator 1, the power conductor 2 includes a choke 19. The capacitors 17 and 17A prevent the passage of the welding current short circuit.

According to the arrangement of FIG. 3, in the first arc striking circuit 13, the secondary winding 12 of the HF generator is here connected through the conductor 16'A to the auxiliary electrode 9, while the conductor 16 including the capacitor 17 and the induction coil 18 is connected to the main electrode 3. The second HF discharge circuit includes the isolating capacitor 17A, the conductors 16A and 5, the workpiece 6 and the conductor 16'A, the HF discharge occurring between the electrode 9 and the workpiece 6, possibly through a part of the electrode 3.

By way of a numerical example, satisfactory tests have been carried out in automatic welding with an induction coil 18 having an inductance of 50 to 60 μH, with an HF frequency of 1 to 1.5 MHz and a cable length of the order of 16 m between the HF transformer 11 and the welding head 4. There was obtained in this way a total reliability of the striking of the arc with a ratio between the impedances of the two arc striking circuits of the order of 5.

The arc striking device according to the invention may be used in a dc or ac TIG welding which is manual or automatic and has a single or double gas stream, and also in plasma welding or cutting. In the last two cases, the auxiliary electrode is replaced by a nozzle which coaxially surrounds the electrode, and the first arc striking circuit (circuit 13) serves to establish a pilot arc. When the arc welding or cutting is carried out with alternating current, the HF generator 10 may be modified in a conventional manner so as to render the device an arc striking and stabilizing device, i.e. a device for striking and restriking the arc for each alternation or each semi-alternation of the welding current.

What is claimed is:

1. A device for striking an electric arc between a non-consumable main electrode and a workpiece to be welded or cut under a gaseous atmosphere which is conducted through a nozzle surrounding the main electrode, said device comprising said main electrode, said nozzle, an auxiliary electrode carried by said nozzle, a first arc striking circuit connecting said main electrode to said auxiliary electrode, a high frequency-high voltage generator connected to said arc striking circuit, a second arc striking circuit connecting one of said electrodes to said workpiece, said high frequency-high voltage generator being connected to said second arc striking circuit and said first arc striking circuit having dc blocking means and an HF impedance which is distinctly higher than the impedance of said second arc striking circuit.

2. A device according to claim 1, wherein said first arc striking circuit includes an induction coil to attain said distinctly higher impedance.

3. A device according to claim 2, wherein said first arc striking circuit includes a capacitor in series with said induction coil.

4. A device according to claim 1 wherein said second arc striking circuit connects said auxiliary electrode to said workpiece through said main electrode.

5. A device according to claim 1, wherein the ratio between the HF impedances of said first arc striking circuit and said second arc striking circuit is of the order of 5.

6. In an electric-arc welding and/or cutting torch of the type in which a non-consumable main electrode extends from a nozzle surrounding it, a striking electrode carried on said nozzle creates a starting arc between itself and said main electrode, and between itself and a workpiece to be welded or cut, and high-voltage, high-frequency generating means provides an arc striking voltage to said striking electrode, the improvement wherein a first arc-striking circuit couples said generating means to said striking electrode and said main electrode, a second arc-striking circuit couples said generating means between said striking electrode and said workpiece, and said first circuit includes dc blocking impedance means of sufficient value that the impedance of said first circuit is distinctly higher than the impedance of said second circuit.

7. A torch according to claim 6, further comprising insulating sleeve means disposed in said nozzle and carrying said striking electrode.

8. A torch according to claim 6, wherein said first arc-striking circuit includes a high-frequency transformer secondary, coupled to a primary connected to said generating means, and having one end coupled to said main electrode and another end coupled through an isolating capacitor to high-frequency impedence means which is in turn coupled to said striking electrode; and wherein said second arc-striking circuit includes said secondary, said isolating capacitor, and a lead coupled electrically to said workpiece.

9. A torch according to claim 8, wherein a main power supply supplies welding and/or cutting power to said main electrode and has first and second terminals coupled respectively to said main electrode and said workpiece; and further comprising a high-frequency choke disposed between said first terminal and the second end of said transformer secondary.

10. A torch according to claim 6, wherein said first arc-striking circuit includes a high-frequency transformer secondary, coupled to a primary connected to said generating means, and having one end coupled to said striking electrode and another end coupled through an isolating capacitor to high-frequency impedance means which is in turn coupled to said main electrode; and wherein said second arc-striking circuit includes said secondary, said isolating capacitor, and a conductor coupling said isolating capacitor to said workpiece.

11. A torch according to claim 10, wherein said second arc-striking circuit further includes a portion of said main electrode through which passes the arc generated by said second arc-striking circuit as said main electrode approaches said workpiece.

* * * * *